(12) United States Patent
Wang et al.

(10) Patent No.: US 7,682,233 B2
(45) Date of Patent: Mar. 23, 2010

(54) BLOWER FOR AIR CONDITIONER OF AUTOMOTIVE VEHICLES

(75) Inventors: Yoonho Wang, Daejeon-si (KR); Jeongjae Lee, Daejeon-si (KR); Seongseok Han, Daejeon-si (KR); Booyong Um, Daejeon-si (KR)

(73) Assignee: Halla Climate Control Corporation, Daejeon-si (KR)

( * ) Notice: Subject to any disclaimer, the term of this patent is extended or adjusted under 35 U.S.C. 154(b) by 226 days.

(21) Appl. No.: 11/453,590

(22) Filed: Jun. 15, 2006

(65) Prior Publication Data

US 2006/0285967 A1   Dec. 21, 2006

(30) Foreign Application Priority Data

Jun. 17, 2005  (KR) ........................ 10-2005-0052385
May 25, 2006  (KR) ........................ 10-2006-0047089

(51) Int. Cl.
*B60H 1/02* (2006.01)
*F01D 3/02* (2006.01)

(52) U.S. Cl. ........................ 454/160; 415/101
(58) Field of Classification Search ............. 454/90–92, 454/99–109, 112–120, 136–145, 160, 88, 454/75; 415/98; 165/11.1, 204; 237/12.3 A
See application file for complete search history.

(56) References Cited

U.S. PATENT DOCUMENTS

2003/0056528 A1* 3/2003 Okamoto et al. .............. 62/186

2003/0228213 A1* 12/2003 Bikos et al. .................. 415/101

FOREIGN PATENT DOCUMENTS

JP          05-10016      2/1993
JP          2006-309216   11/2000

* cited by examiner

*Primary Examiner*—Steve McAllister
*Assistant Examiner*—Helena Kosanovic
(74) *Attorney, Agent, or Firm*—Warn Partners, P.C.

(57) ABSTRACT

The present invention relates to a blower for air conditioner of automotive vehicles capable of striving to increase the blowing volume and reduce noise, and simplifying the structure of the blower by distributing the air come into the inside of an intake duct effectively to an upper blowing wheel and a lower blowing wheel.

The blower for air conditioner of automotive vehicles comprises a scroll case formed with upper/lower suction openings at the upper/lower surfaces and a discharge opening at one side; a double suction type centrifugal fan mounted rotatably at the scroll case, and having the upper/lower blowing wheels integrated with a hub plate in the opposite direction, to which a motor is connected; an intake duct with inside/outside air suction openings and an intake door for controlling the opening degree of the inside/outside suction openings, and forming an upper air passage and a side air passage for distributing the air sucked through the inside/outside air suction openings toward the upper/lower suction openings, wherein, a ratio of an air suction cross-sectional area S1 of the upper suction opening versus a cross-sectional area S2+S3 of the side air passage is 6:4~8:2.

5 Claims, 8 Drawing Sheets

Prior Art

Prior Art

Prior Art

BLOWER FOR AIR CONDITIONER OF AUTOMOTIVE VEHICLES

BACKGROUND OF THE INVENTION

1. Field of the Invention

The invention relates to a blower for air conditioner of automotive vehicles, more particularly, to a blower for air conditioner of automotive vehicles, which is capable of striving to increase the blowing volume and reduce noise, and simplifying the structure of the blower by distributing the air come into the inside of an intake duct effectively to an upper blowing wheel and a lower blowing wheel in the field of the blower with a double suction type centrifugal fan.

2. Background Art

The vehicle air conditioning device comprises a cooling system for cooling the indoor of a vehicle, and a heating system for heating the indoor of the vehicle. The cooling system is constructed that the indoor of the vehicle is cooled by emitting the blowing air into the indoor of the vehicle after it is changed into cold air by means of the heat exchange between the cooling medium circulating from a condenser to a compressor via a receiver drier, an expansion valve, and an evaporator, by the driving of the compressor, and the blowing air passing through the surface of the evaporator by the blower. Also, the heating system is constructed that the indoor of the vehicle is heated by the heat exchange between the cooling water passing through a heater core and the blowing air.

The blower is connected to an inlet of a case for an air conditioning device, in which the evaporator of the cooling system and the heater core of the heating system are built-in, to thereby blow the inside air or outside air to the inside of the case of the air conditioning device.

In other words, as shown in FIG. 1 and FIG. 2, the conventional blower comprises a scroll case 10 formed with a discharge opening 14 at one side to be connected to a case of the air conditioning device (not shown), and its upper portion opened; an intake duct 30 mounted at the upper portion of the scroll case, and equipped with at least one of the inside/outside air suction openings 32, 34 and an intake door 36 for converting the opening degree of at least one of the inside/outside air suction openings 32, 34; a suction opening 20 for forming an air suction passage between the intake duct 30 and the scroll case 10; a centrifugal fan 40 mounted rotatably at the scroll case 10; and a motor 50 connected to the centrifugal fan 40 through the lower portion of the scroll case 10 to rotate it. The reference numeral 60 in FIG. 1 denotes an air filter for filtering foreign substance contained in the air sucked into the intake duct 30, and the air filter 60 can be selectively mounted.

The centrifugal fan 40 is a single suction type, and is constructed to suck air through one side of the axial direction, that is, it is constructed to suck the air through the suction opening 20 according to the rotation of the fan and emits it in the radial direction. In other words, the centrifugal fan 40 comprises a hub plate 42 connected to an upper end of a shaft 52 of the motor 50, a plurality of blades 44 disposed in radial direction along the upper edge of the hub plate 42, a supporting ring 46 connected and supporting upper ends of the blades 44. Also, the hub plate 42 is conventionally formed to depress toward the inside (that is, upper side) of a space defined by the blades 44, so that a portion of the motor 50 is connected to the hub plate 42 with inserted into the inside of the space.

Accordingly, when the centrifugal fan 40 is rotated by the driving of the motor 50, the inside air or the outside air can flow in the axial direction of the centrifugal fan 40 through the suction opening 20, through the inside air suction opening 32 or outside air suction opening 34, which are selectively opened according to the control of the opening degree of the intake door 36, to thereby flow along the slanting upper surface of the hub plate 42 to be discharged in the radial direction of the centrifugal fan 40. Thus, the air flows along the side wall of the scroll case 10 and is ventilated into the inside of an air conditioning case (not shown) through a discharge opening 14 with increased blowing pressure and blowing volume.

However, with regard to the blower with a single suction type centrifugal fan 40, when the air is emitted from the centrifugal fan 40 in the radial direction, as shown in FIG. 1, there occurs a problem that flow dispense of the air in the upper/lower portions is not even because the air is emitted along the slanting surface of the hub plate 42.

Furthermore, as shown in FIG. 2, if the structure of the air flow at a portion, where a scroll portion 12 of the scroll case 10 and the discharge opening 14 meet, that is, at a cut-off region 16, is to be reviewed, the air emitted from the centrifugal fan 40 in the radial direction and flowing directly into the discharge opening 14 collides with the air emitted from the centrifugal fan 40 in the radial direction to flow along the side wall of the scroll portion 12 at the cut-off region 16 thereby to be mixed to produce turbulent flow. Thus, when the air flow dispense is not even and the turbulent flow is generated, there also occurs a problem of the reduction of the blowing volume and the increase of the noise.

To solve such problems arising in the conventional blower with a single suction type centrifugal fan, there is suggested a double suction type blower capable of sucking and emitting the air from both directions, so that it is possible to increase the blowing volume, reduce noise, and induce two layer air flowing.

As one example for such a double suction type blower, there is disclosed a Japanese patent application laid open No. 200-309216, in which a motor is engaged with two single suction type blowing wheels connected to each other in the opposite direction. However, according to such conventional technology, the size of the blower becomes large, the number of parts thereof increases, and the number of assembly work increases to thereby increase the production cost of the blower.

Another example of such a double suction type blower is disclosed in Japanese utility model application laid open No. Hei 05-10016. Such blower comprises, as shown in FIG. 3, a scroll case formed with upper/lower suction openings 112, 114 at upper/lower surfaces and a discharge opening (not shown) at one side; a double suction type centrifugal fan 120 mounted rotatably at the scroll case 110 with the upper/lower blowing wheels 122, 124 formed integrally with a hub plate 126 in the direction opposing to each other; an intake duct 140 with an outside air suction opening 142, a plurality of inside air suction openings 144, and a plurality of (four) intake doors 146 for controlling the opening degree of the suction openings 142, 144, and forming air passages 150, 152 for distributing the air to the upper/lower suction openings 112, 114; and a motor 130 connected to the hub plate 126 via the lower suction opening 114 to rotate the double suction type centrifugal fan 120.

According to the blower shown in FIG. 3, when the outside air suction mode is operated, the outside air is dispensed and sucked toward the upper/lower suction openings 112, 114 with all the inside air suction openings 144 closed and only the outside air suction opening 142 opened. Also, when the inside air suction mode is operated, the inside air is dispensed and sucked toward the upper/lower suction openings 112, 114 with the outside air suction openings 142 closed and all the inside air suction opening 144 opened. Furthermore, when the inside/outside air suction mode is operated, the inside/outside air is mixed and sucked toward the upper suction opening 112, and the inside air is sucked toward the lower suction opening 114, with a portion of the outside air suction opening 142 opened and a portion of the inside air suction openings 144 selectively opened.

However, with regard to the example shown in FIG. 3, especially, when the inside air suction mode is operated, the dispense of the air toward the upper/lower suction openings 112, 114 is not performed effectively, so that it is required to form a plurality of inside air suction openings 144 and a plurality of intake doors 146 to solve such problem. Also, there occur problems that the size of the blower should be increased, the mounting space for the blower with regard to the vehicle should be increased, and the structure of the driving means such as a lever mechanism (not shown) for actuating the intake doors 146, and the like becomes complex, because a portion of the intake doors 146 is constructed such that inside air suction openings 144 are configured to be opened toward the outside of the blower. In addition, with regard to the blower shown in FIG. 3, water or foreign substance can be concentrated at the bottom of the intake duct 140, that is, at the lower of the motor 130, to thereby cause disorder of the motor 130 or mis-operation of the motor 130.

SUMMARY OF THE INVENTION

Therefore, the present invention has been made in view of the above problems occurring in the prior art, and it is an object of the present invention to provide a blower for a vehicle air conditioning device, which is capable of striving to increase the blowing volume and reduce noise, and simplifying the structure of the blower by distributing air come into the inside of an intake duct effectively to an upper blowing wheel and a lower blowing wheel in the field of the blower with a double suction type centrifugal fan.

To achieve the above object of the present invention, there is provided a blower for a vehicle air conditioning device comprising scroll case formed with upper/lower suction openings at the upper/lower surfaces and a discharge opening at one side; a double suction type centrifugal fan mounted rotatably at the scroll case, and having the upper/lower blowing wheels integrated with a hub plate in the opposite direction, to which a motor is connected; an intake duct with inside/outside air suction openings and an intake door for controlling the opening degree of the inside/outside suction openings, and forming an upper air passage and a side air passage for distributing the air sucked through the inside/outside air suction openings toward the upper/lower suction openings, wherein, a ratio of an air suction cross-sectional area of the upper suction opening versus a cross-sectional area of the side air passage is 6:4~8:2.

According to the blower for a vehicle air conditioning device of the present invention, a ratio of a height of the upper blowing wheel versus a height of the lower blowing wheel is preferable to be 6:4~8:2.

Also, it is preferable that a water block wall is formed around the motor in the bottom of the intake duct to block the inflow of water or foreign substance toward the motor, and a drain port is formed at one side of the bottom in the intake duct to discharge water concentrated in the bottom of the intake duct toward the air conditioning case.

Furthermore, it is preferable that the scroll case is formed with a dividing plate for dividing the inside thereof into an upper portion and a lower portion on the basis of the hub plate.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiment of the present invention with reference to the attached drawings. The terms and words used in the description of the present invention should be construed as meanings and concepts conforming to the technical spirit of the present invention based on the principle that the inventor can define the concept of the term appropriately to explain his invention in best way.

Figure 1:
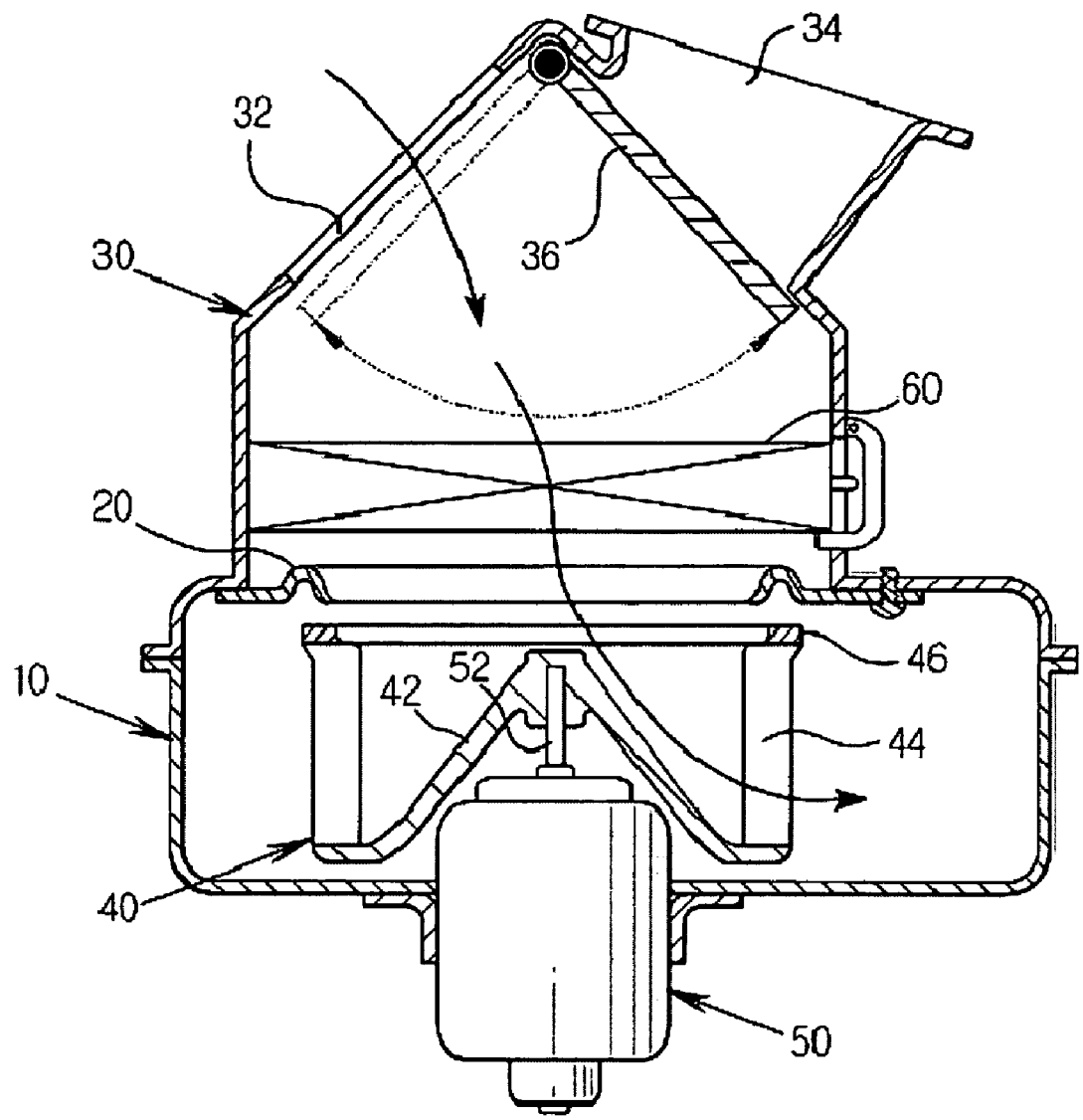
FIG. 1 is a cross-sectional view showing one example of a conventional blower for a vehicle air conditioning device.
Figure 2:
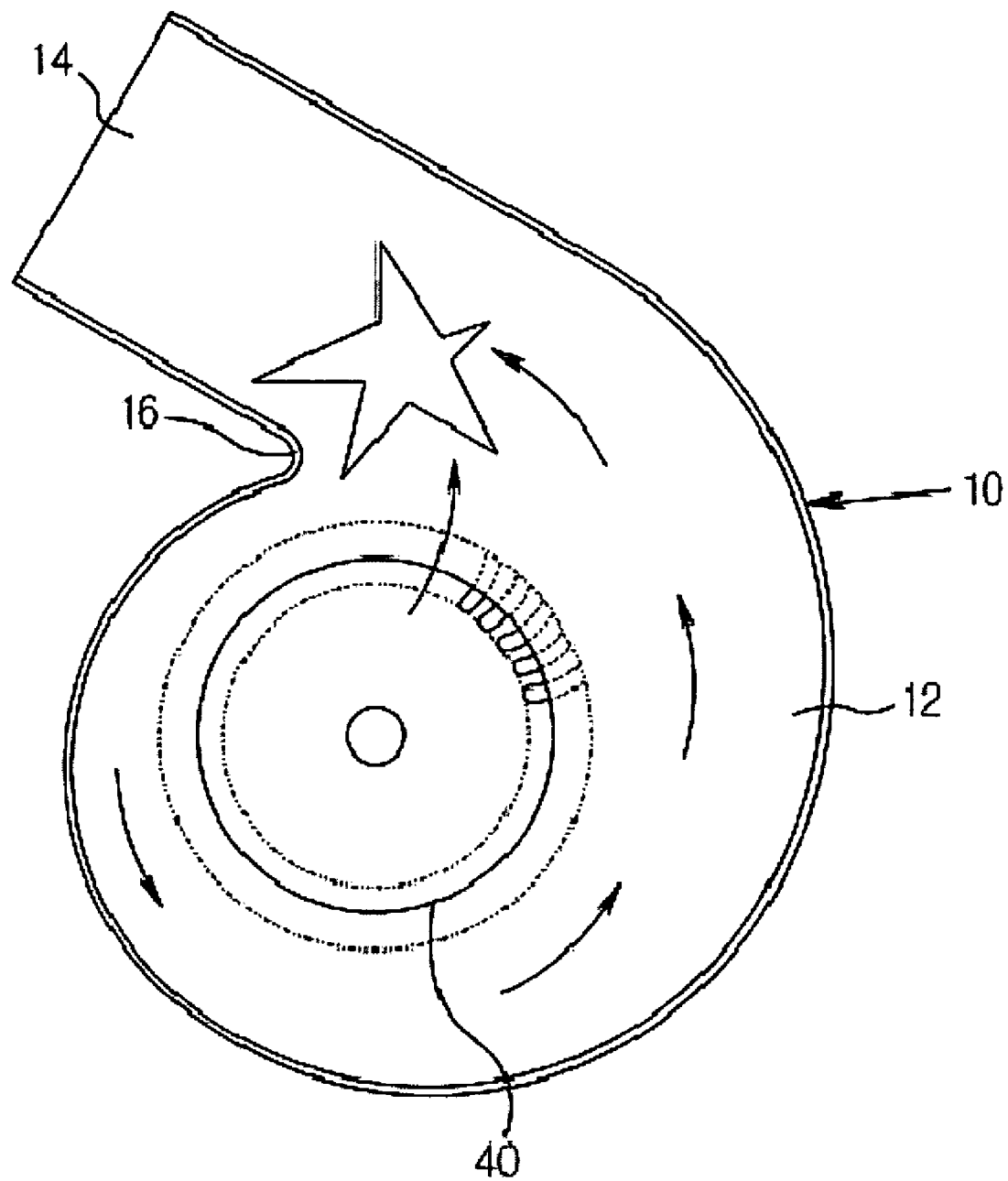
FIG. 2 is a plane cross-sectional view of FIG. 1.
Figure 3:
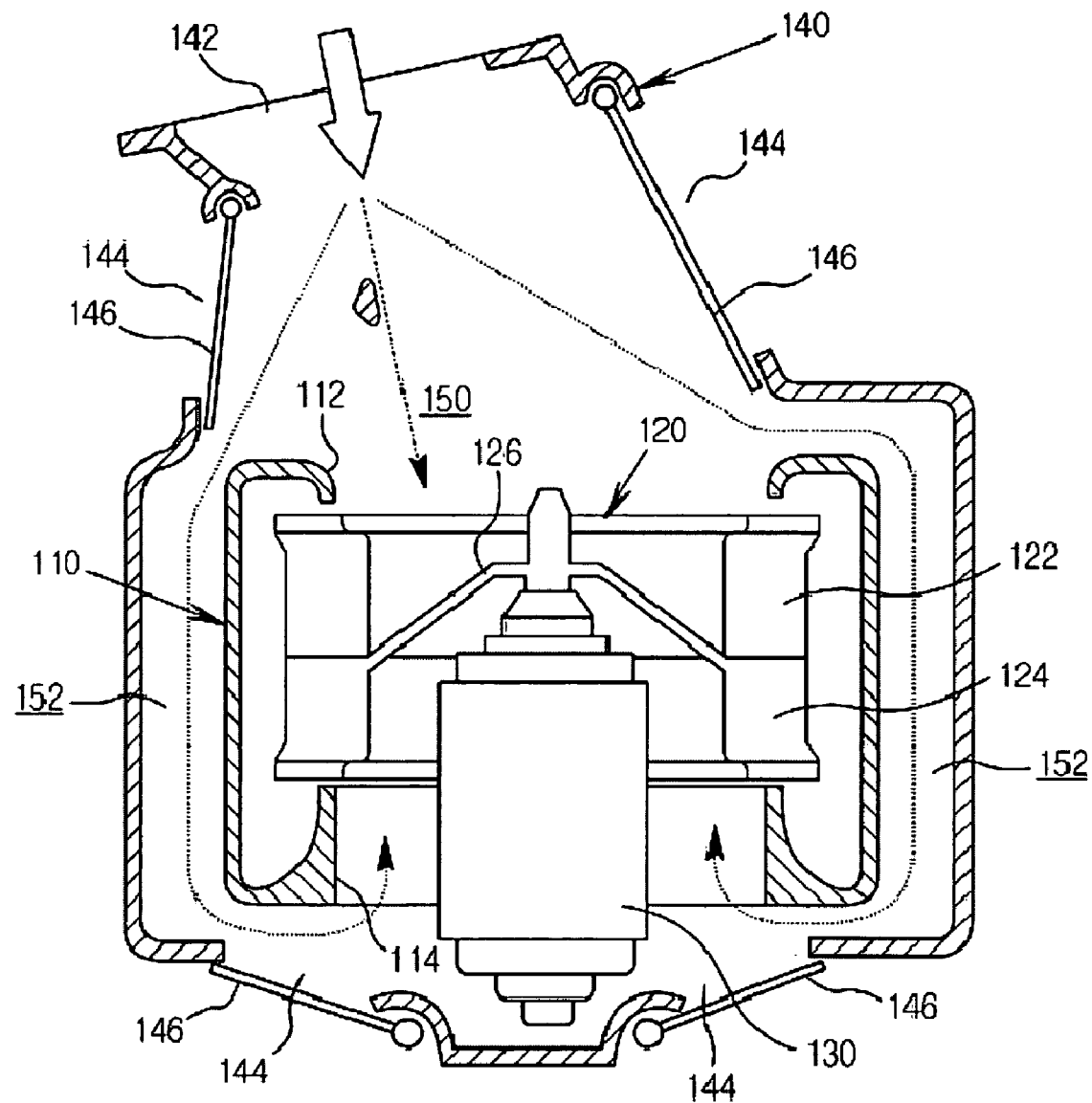
FIG. 3 is a cross-sectional view showing another example of the conventional blower for a vehicle air conditioning device.
Figure 4:
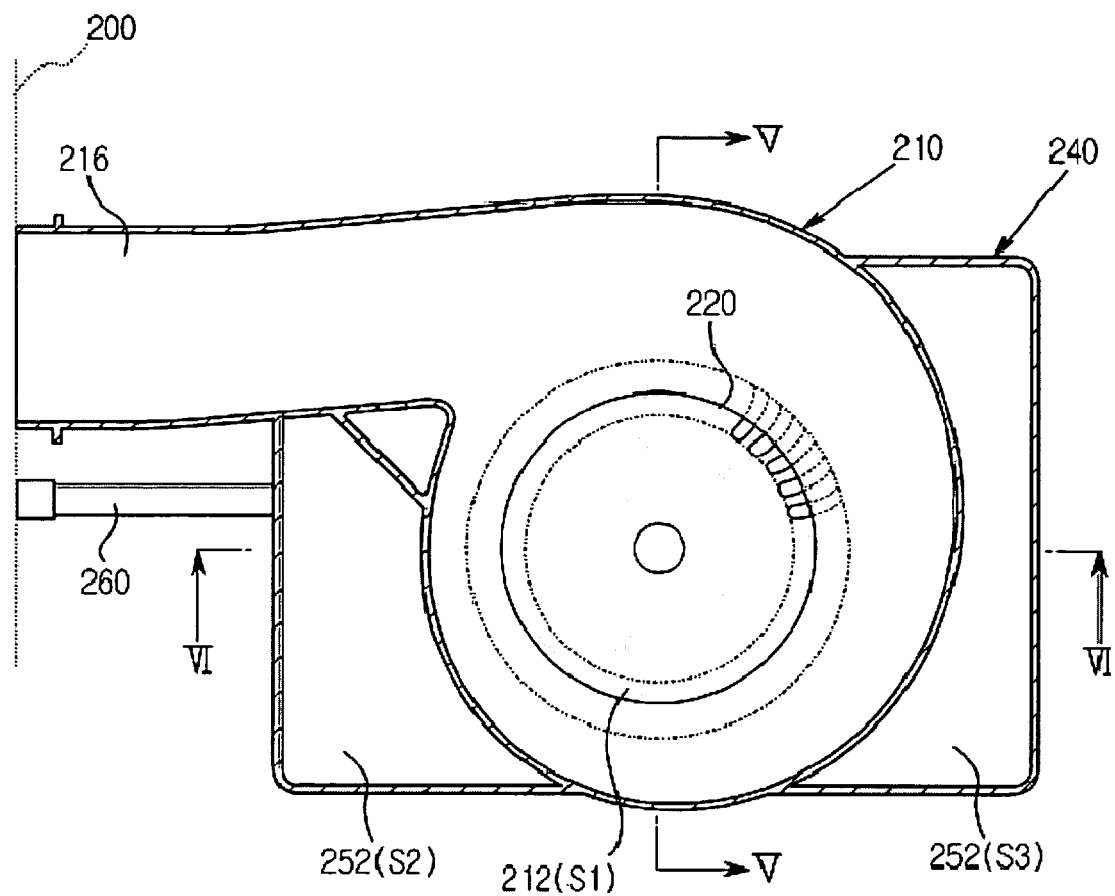
FIG. 4 is a plane cross-sectional view showing a blower for a vehicle air conditioning device according to the present invention.
Figure 5:
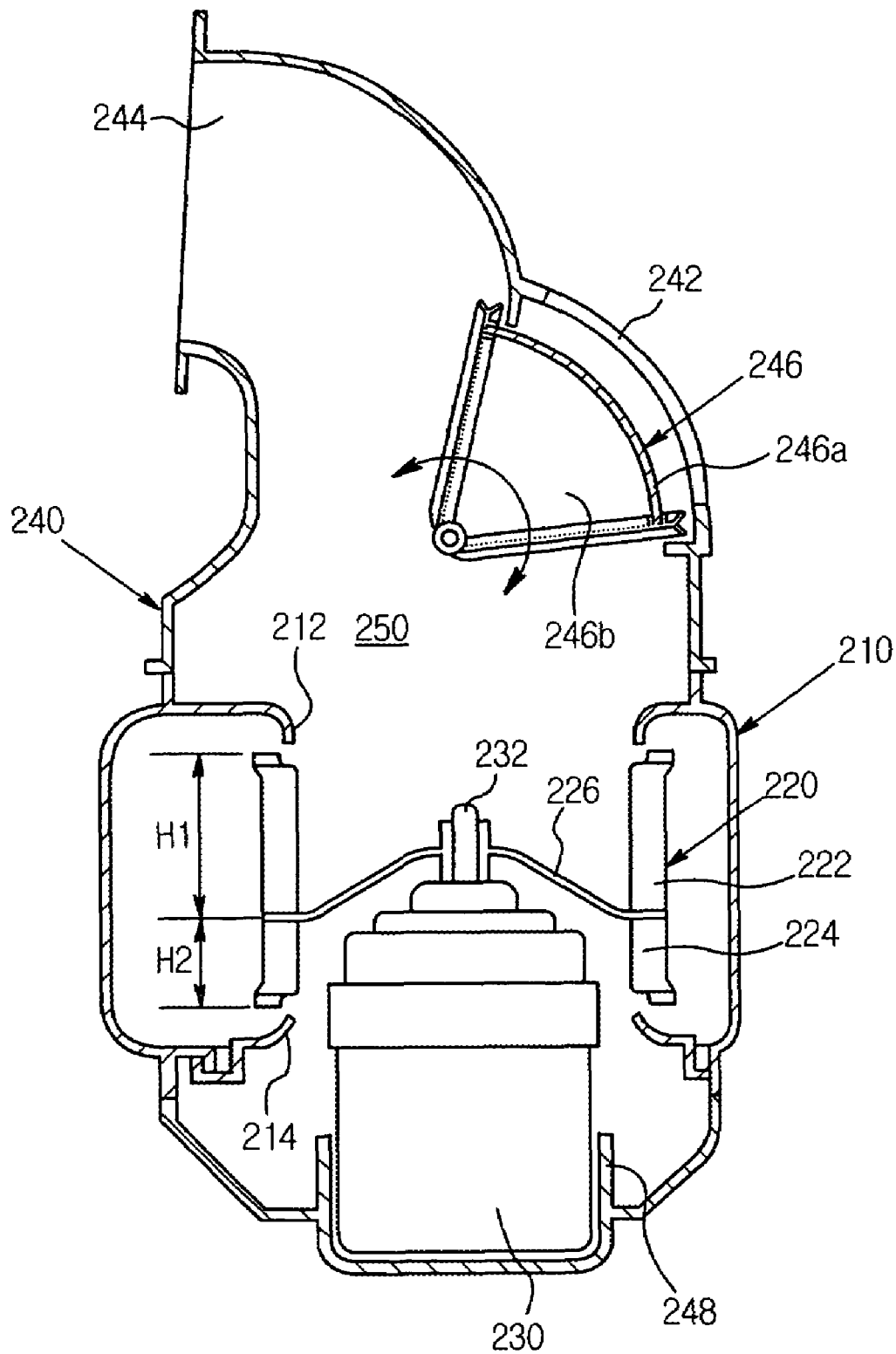
FIG. 5 is a cross-sectional view taken along line V-V of FIG. 4.
Figure 6:
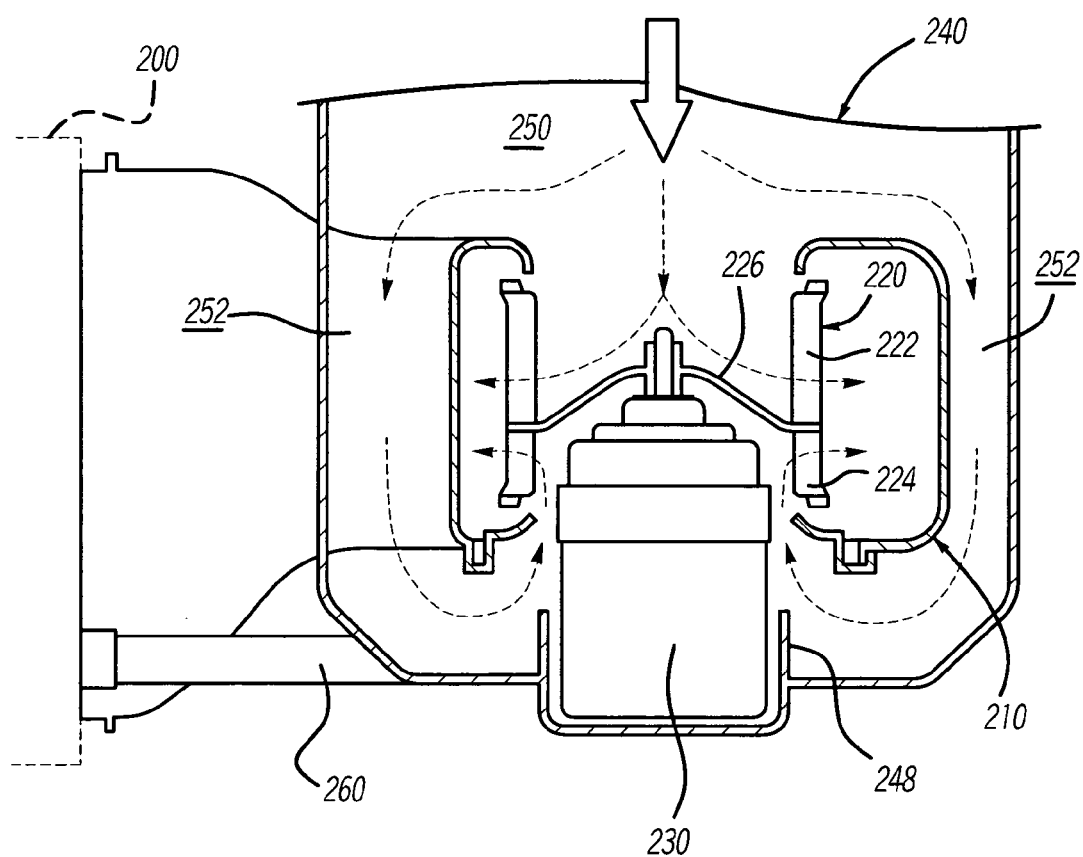
FIG. 6 is a cross-sectional view taken along line VI-VI of FIG. 4.

Referring to FIGS. 4 through 6, there is shown a blower for a vehicle air conditioning device according to the present invention.

The vehicle air conditioning device according to the present invention comprises a scroll case 210, a double suction type centrifugal fan 220, a motor 230, and an intake duct 240.

The scroll case 210 is constructed such that the double suction type centrifugal fan 220 can be mounted rotatably, and is formed with upper/lower suction openings 212, 214 at the upper/lower surfaces, and a discharge opening 216 at one side to be connected to an air conditioning case 200.

The double suction type centrifugal fan 220 is mounted at the inside of the scroll case 210. The double suction type centrifugal fan 220 is equipped with upper/lower blowing wheels 222, 224 formed integrally with a hub plate 226 at the upper/lower portions, to which the motor 230 is connected.

According to the present invention, it is preferable that a ratio of a height H1 of the upper blowing wheel 222 versus a height H2 of the lower blowing wheel 224 is 6:4~8:2.

Meanwhile, the intake duct 240 is to suck the inside air or the outside air selectively into the inside of the scroll case 210, and is equipped with an intake door 246 for controlling the inside/outside air suction openings 242, 244 and the opening degree of the inside/outside air suction openings 242, 244.

The intake door 246 can be constructed to be a dome shape. For instance, it can comprise a curved surface plate 246a for controlling the opening degree of the inside/outside air suction openings 242, 244 based on the rotation of the intake door 246, and both supporting plates 246a, 246b bent from both ends of the curved surface plate 246a and supported rotatably by the wall surface of the intake duct 240. The intake door 246 is constructed to control the opening degree of the inside/outside air suction openings 242, 244 at the inside of the intake duct 240 based on the rotation degree thereof.

Also, the intake duct 240 is equipped with an upper air passage 250 and a side air passage 252 for distributing the air sucked through the inside/outside air suction openings 242, 244 toward the upper/lower suction openings 212, 214. In other words, the upper air passage 250 is constructed to communicate with the upper blowing wheel 222 through the upper suction opening. Also, the side air passage 252 is constructed to make the upper air passage 250 communicated with the lower suction opening 214 by disposing the side wall and the bottom of the intake duct 240 with a predetermined space from the side wall and the bottom of the scroll case 210.

Accordingly, a portion of the air, which has been sucked into the upper air passage 250 of the intake duct 240 through the inside/outside air suction openings 242, 244 according to the rotation of the double suction type centrifugal fan 220, can flow into the upper blowing wheel 222 through the upper suction opening 212, and remaining portion of the suction air can flow into the lower blowing wheel 224 through the side wall air passage 252 and the lower suction opening 214.

However, with regard to the air flowing structure as described above, the motor rotating the double suction type centrifugal fan 220 is constructed such that a shaft 232 thereof is connected to the hub plate 226 via the lower suction opening 214 with the lower end supported by the intake duct 240. Accordingly, as the air suction cross-sectional area S1 of the upper suction opening 212 is not only larger than the air suction cross-sectional area S2 of the lower suction opening, but the height H1 of the upper blowing wheel 222 is also bigger that the height H2 of the lower suction opening 224, it is possible to dispense the air sucked into the intake duct 240 toward the upper blowing wheel 22 and the lower blowing wheel 224 effectively, when the air flowing structure is designed such that larger blowing volume flows toward the upper blowing wheel 222 than toward the lower blowing wheel 224.

In consideration of such air flowing structure, the present invention is constructed that larger blowing volume can be dispensed toward the upper blowing wheel 222 by making the air suction cross-sectional area S1 of the upper suction opening 212 larger than the cross-sectional area S2+S3 of the side wall air passage 252. In other words, according to the present invention, a ratio of the cross-sectional area S1 of the upper suction opening 212 versus the cross-sectional area S2+S3 of the side wall air passage 252 is preferable to be 6:4~8:2.

Figure 7:
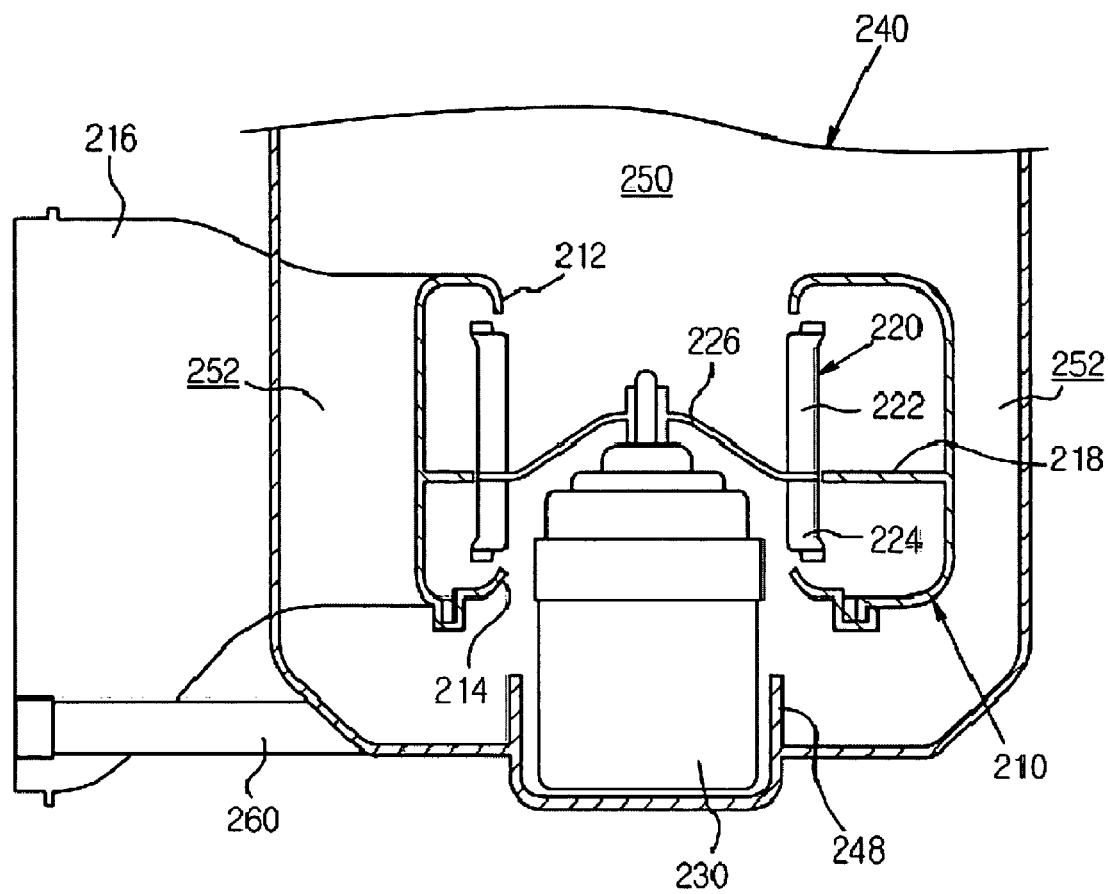
FIG. 7 is a partial cross-sectional view showing another example of the blower for a vehicle air conditioning device according to the present invention.

Then, as shown in FIG. 7, a dividing plate 218 can be further mounted in the scroll case 210 to divide the inside thereof into an upper portion and a lower portion on the basis of the hub plate 226. In this regard, the inside of the air conditioning case 200 connected to the discharge opening 216, correspondingly to the blower of the present invention, is also preferable to be divided by another dividing plate 218 into an upper portion and a lower portion.

Furthermore, it is preferable that the water block wall 248 is formed around the motor 230 in the bottom of the intake duct 240 to block the inflow of water or foreign substance toward the motor 230, and a drain port 260 is formed at one side of the bottom in the intake duct 240 to discharge the water concentrated in the bottom of the intake duct 240 toward the air conditioning case 200.

Next, the action of the blower for the vehicle air conditioning device according to the present invention, as constructed above, will be described hereinafter.

When the air suction mode is set by driving the motor 230 and operating the intake door 246, the inside air or outside air can be sucked into the inside of the intake duct 240, that is, into the upper air passage 250, through the inside air suction opening 242 or the outside air suction opening 244. A portion of the sucked air flows into the upper blowing wheel 222 from the upper air passage 250 through the upper suction opening 212, and remaining portion of the sucked air flows into the lower blowing wheel 224 through the side air passage 252 and the lower suction opening 214.

In such an air flowing process, since the air suction cross-sectional area S1 of the upper suction opening 212 is larger than the air suction cross-sectional area S2+S3 of the side air passage 252 and the height H1 of the upper blowing wheel 222 is bigger than the height H2 of the lower blowing wheel 224, larger blowing volume can be dispensed toward the upper blowing wheel 222, in which relatively larger blowing volume can be flowed, and smaller blowing volume can be dispensed toward the lower blowing wheel 224, in which relatively smaller blowing volume can be flowed, to thereby dispense the air effectively, resulting in the increase of the whole blowing volume.

Figure 8:
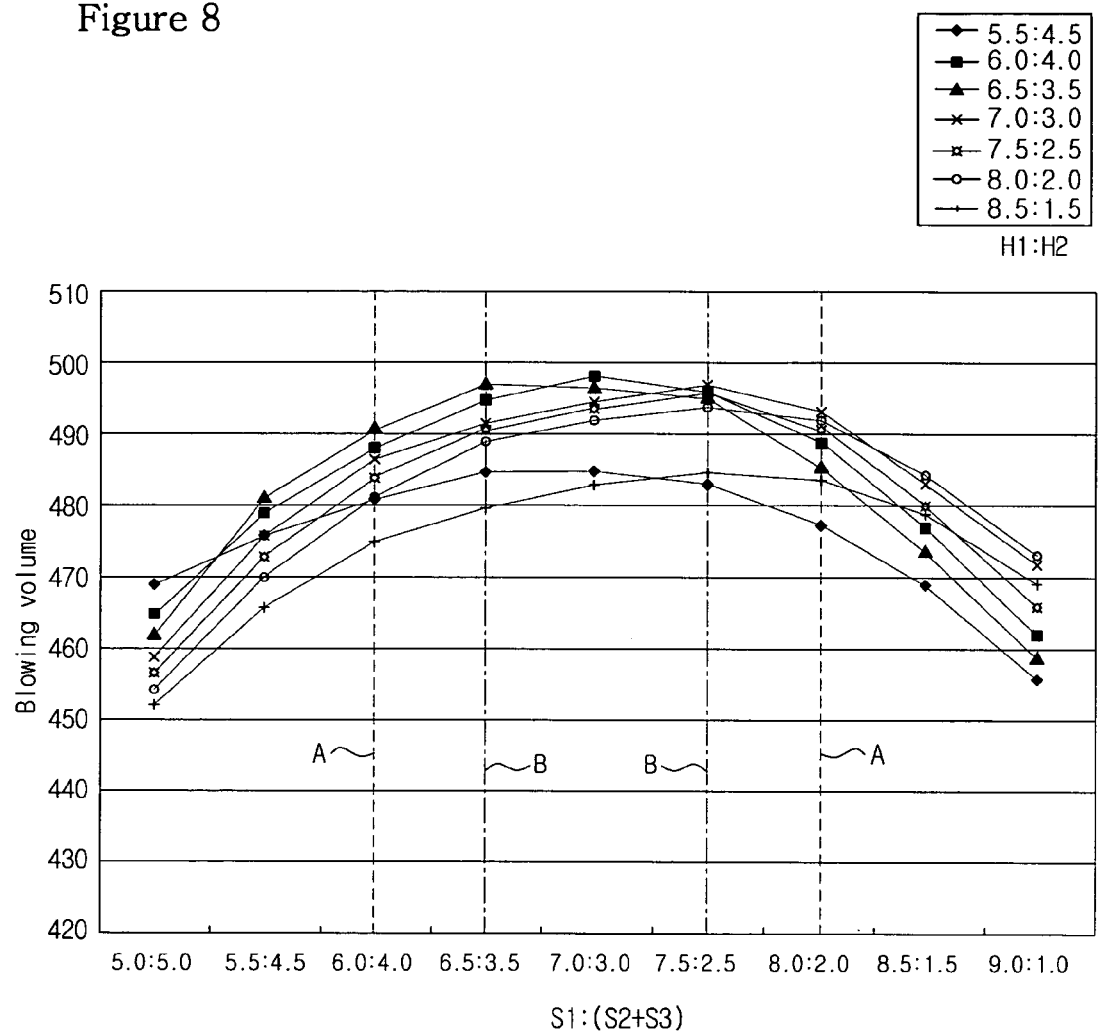
FIG. 8 is a graphic diagram showing the results of measuring the blowing volume with changing a ratio between the cross-sectional area of a side air passage versus that of an upper suction opening with regard to the blower for a vehicle air conditioning device according to the present invention.

The present inventors have performed experiments with regard to the identical type blowers, with changing the ratio of the air suction cross-sectional area S1 of the upper suction opening 212 versus the cross-sectional area S2+S3 of the side air passage 252, as well as changing the ratio of the height H1 of the upper blowing wheel 222 versus the height H2 of the lower blowing wheel 224. As a result, following results have been obtained as shown in table 1 and in FIG. 8. In other words, it is possible to obtain larger blowing volume (unit: CMH) in the respective range of 6:4~8:2 with regard to the ratio of the cross-sectional area (S1:S2+S3) and the ratio of the height (H1:H2), as shown in table 1 as a dark image portion and as a proper use range (A-A line) as shown in FIG. 8. Also, although not shown in the drawings, the noise can be also reduced.

TABLE 1

| Classification | | Ratio of cross-sectional area (S1:S2+S3) | | | | | | | | |
|---|---|---|---|---|---|---|---|---|---|---|
| | | 5.0:5.0 | 5.5:4.5 | 6.0:4.0 | 6.5:3.5 | 7.0:3.0 | 7.5:2.5 | 8.0:2.0 | 8.5:1.5 | 9.0:1.0 |
| Ratio of height (H1:H2) | 5.5:4.5 | 469 | 476 | 481 | 485 | 485 | 483 | 478 | 469 | 456 |
| | 6.0:4.0 | 465 | 479 | 488 | 495 | 498 | 496 | 489 | 477 | 462 |
| | 6.5:3.5 | 462 | 481 | 491 | 497 | 497 | 495 | 486 | 474 | 459 |
| | 7.0:3.0 | 459 | 476 | 487 | 492 | 495 | 497 | 494 | 483 | 472 |
| | 7.5:2.5 | 457 | 473 | 484 | 491 | 494 | 496 | 491 | 480 | 466 |
| | 8.0:2.0 | 454 | 470 | 481 | 489 | 492 | 494 | 492 | 484 | 473 |
| | 8.5:1.5 | 452 | 466 | 475 | 480 | 483 | 485 | 484 | 479 | 469 |

Furthermore, it is more preferable that the ratio of the air suction cross-sectional area S1 of the upper suction opening 212 versus the cross-sectional area S2+S3 of the side air passage 252 is 6.5:3.5~7.5:2.5. In other words, when the ratio of the air suction cross-sectional area S1 of the upper suction opening versus the cross-sectional area S2+S3 of the side air passage is substantially identical with the ratio of the height H1 of the upper blowing wheel 222 versus the height H2 of the lower blowing wheel 224 (thick letters), the blowing volume becomes largest at the dark image portion in table 1, in which the cross-sectional area ratio of S1:S2+S3 is 6.5:3.5~7.5:2.5 and in the range of B-B line in FIG. 8.

Whereas, as shown in table 1 and in FIG. 8, when the ratio of the height H1 of the upper blowing wheel 222 versus the height H2 of the lower blowing wheel 224 is deviated from the range of 6:4~8:2 (5.5:4.5, 8.5:1.5), it can be seen that the blowing volume decreases notably. Also, when the ratio of the air suction cross-sectional area S1 of the upper suction opening 212 versus the cross-sectional area S2+S3 of the side air passage 252 is deviated from the range of 6:4~8:2, it can be seen that the blowing volume becomes smaller than those measured in the ratios of the height (H1:H2) of 5.5:4.5, 8.5:1.5, where the blowing volume was relatively small.

Meanwhile, in the present invention, when the water is concentrated at the bottom of the intake duct 240 due to the inflow of the rainfall during the operation of the blower, the water is prevented from permeating into the motor 230 by means of the water blocking wall 248, and it is discharged through the discharging opening 260 toward the air conditioning case 200, so that it can be discharged with the condensation water generated in the evaporator (not shown) through an condensation water discharging opening (not shown).

According to the blower for a vehicle air conditioning device according to the present invention as constructed above, the ratio of the air suction cross-sectional area S1 of the upper suction opening 212 versus the cross-sectional area S2+S3 of the side air passage 252 communicating with the inside of the upper/lower blowing wheels 222, 224, and the ratio of the heights H1, H2 of the upper/lower blowing wheels 222, 224 are designed to be optimum, so that it is possible to contrive to increase the whole blowing volume and to reduce the noise, resulting in the increase of the capacity of the blower.

Also, the driving means for actuating the intake door 246 can be simplified by employing respective inside/outside air suction openings 242, 244 and the intake door 246, so that it is possible to contrive to reduce production cost of the blower and improve the productivity, and to decrease the space required to mount the blower to the vehicle.

What is claimed is:

1. A blower for air conditioner of automotive vehicles comprising scroll case formed with upper/lower suction openings at the upper/lower surfaces and a discharge opening at one side; a double suction type centrifugal fan mounted rotatably at the scroll case, and having the upper/lower blowing wheels integrated with a hub plate in the opposite direction, to which a motor is connected; an intake duct with inside/outside air suction openings and an intake door for controlling the opening degree of the inside/outside suction openings, and forming an upper air passage and a side air passage for distributing the air sucked through the inside/outside air suction openings toward the upper/lower suction opening, a water block wall formed around the motor in the bottom of the intake duct to block the inflow of water or foreign substance toward the motor, and a drain port formed at one side of the bottom in the intake duct to discharge the water concentrated in the bottom of the intake duct toward the air conditioning case: wherein, a ratio of a cross-sectional area S1 of the upper suction opening versus a cross-sectional area S2+S3 of the side air passage is 6:4~8:2 and a ratio of a height H1 of the upper blowing wheel versus a height H2 of the lower blowing wheel is 6:4~8:2.

2. The blower for air conditioner of automotive vehicles according to claim 1, wherein the scroll case is formed with a dividing plate for dividing the inside thereof into an upper portion and a lower portion on the basis of the hub plate.

3. The blower for air conditioner of automotive vehicles according to claim 1, wherein the ratio of the cross-sectional area S1 of the upper suction opening versus the cross-sectional area S2+S3 of the side air passage is 6.5:3.5~7.5:2.5.

4. The blower for air conditioner of automotive vehicles according to claim 1, wherein the ratio of the cross-sectional area S1 of the upper suction opening versus the cross-sectional area S2+S3 of the side air passage is identical with a ratio of a height H1 of the upper blowing wheel versus a height H2 of the lower blowing wheel.

5. A blower for air conditioner of automotive vehicles comprising scroll case formed with upper/lower suction openings at the upper/lower surfaces and a discharge opening at one side; a double suction type centrifugal fan mounted rotatably at the scroll case, and having the upper/lower blowing wheels integrated with a hub plate in the opposite direction, to which a motor is connected; an intake duct with inside/outside air suction openings and an intake door for controlling the opening degree of the inside/outside suction openings, and forming an upper air passage and a side air passage for distributing the air sucked through the inside/outside air suction openings toward the upper/lower suction opening, a water block wall formed around the motor in the bottom of the intake duct to block the inflow of water or foreign substance toward the motor, and a drain port formed at one side of the bottom in the intake duct to discharge the water concentrated in the bottom of the intake duct toward the air conditioning case: wherein, a ratio of a cross-sectional area S1 of the upper suction opening versus a cross-sectional area S2+S3 of the side air passage is about 6:4~8:2.

* * * * *